UNITED STATES PATENT OFFICE.

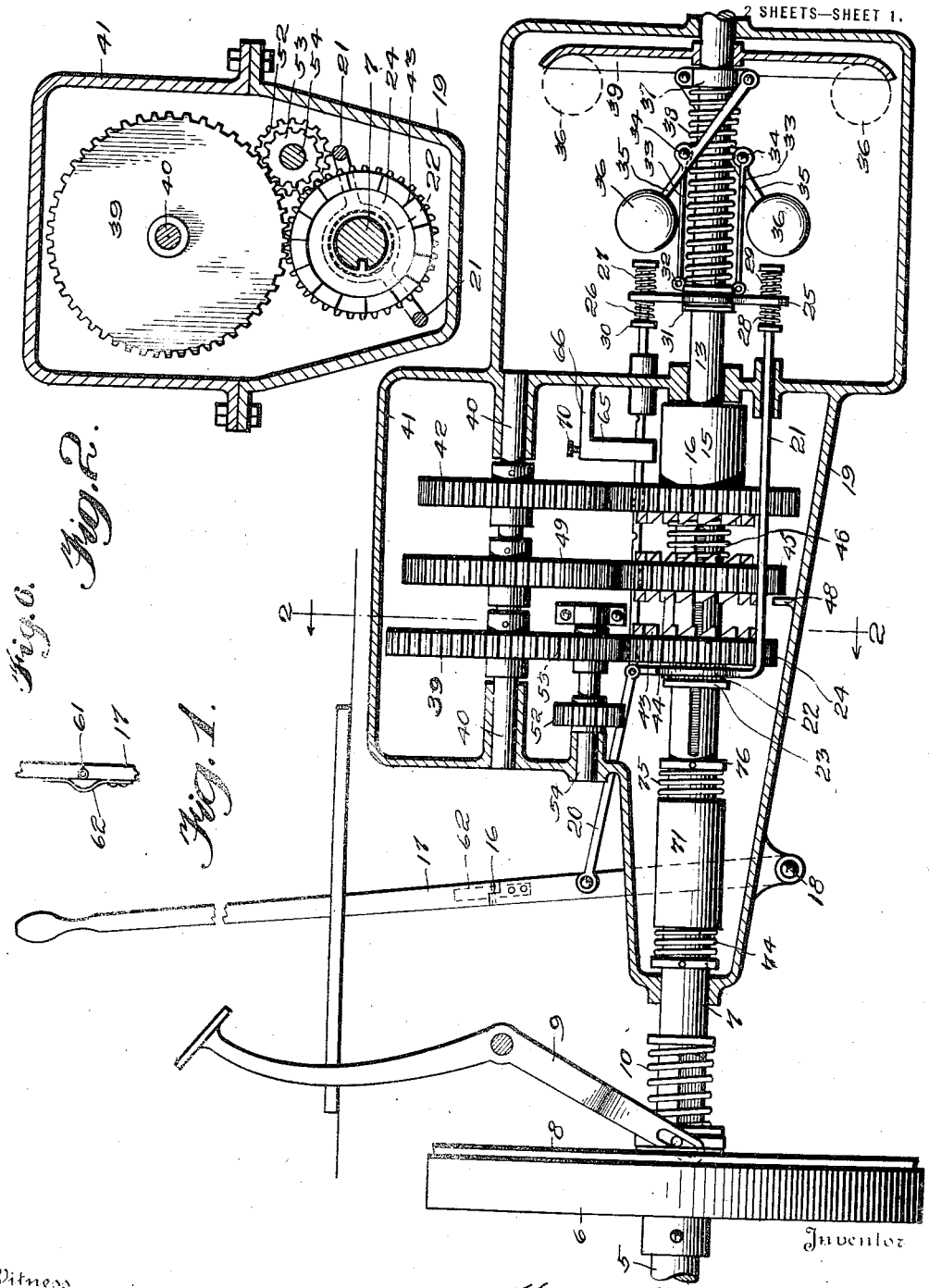

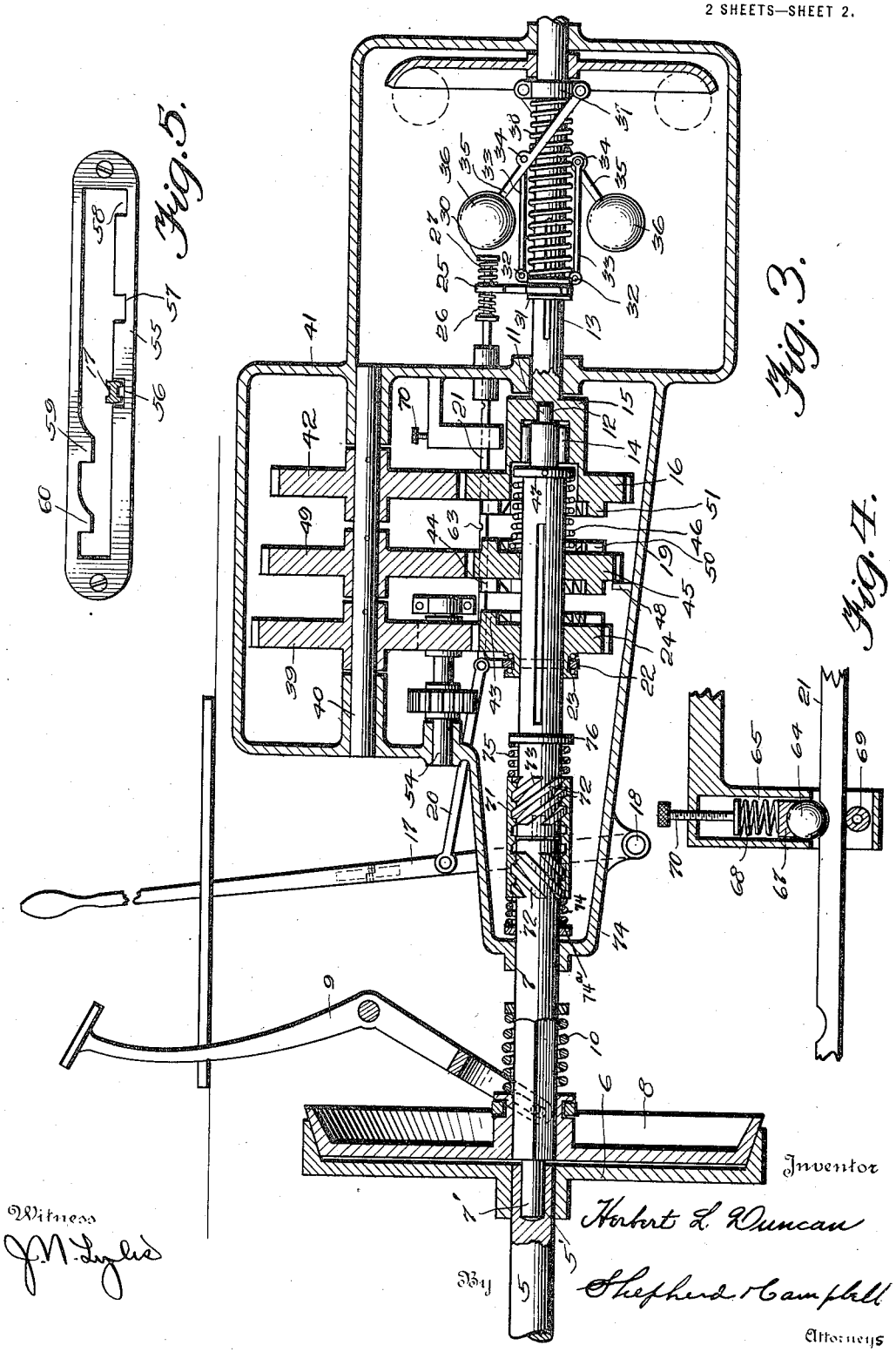

HERBERT L. DUNCAN, OF UNIONTOWN, KENTUCKY.

AUTOMATIC CHANGE-SPEED GEARING.

1,277,299. Specification of Letters Patent. Patented Aug. 27, 1918.

Application filed December 8, 1917. Serial No. 206,201.

*To all whom it may concern:*

Be it known that I, HERBERT L. DUNCAN, a citizen of the United States, residing at Uniontown, in the county of Union and State of Kentucky have invented certain new and useful Improvements in Automatic Change-Speed Gearing, of which the following is a specification.

This invention relates to change speed transmission gearing and its object is to provide an improved structure of this nature in which the necessary changes of speed may be secured positively under control of the driver or in which such changes of speed may be automatically brought about to suit the varying condition of the load or work to be performed.

The mechanism is primarily designed for use upon motor vehicles and particularly automobiles, though it is capable of use in other relations.

When used upon an automobile the mechanism serves to automatically shift the gears to low, intermediate, or high speed to suit the particular conditions of load and grade.

In the accompanying drawing:

Figure 1 is a view in side elevation (with the casing in section), of a mechanism embodying the invention.

Fig. 2 is a transverse vertical section on line 2—2 of Fig. 1.

Fig. 3 is a longitudinal vertical sectional view.

Fig. 4 is a sectional view of a detent hereafter described.

Fig. 5 is a detail plan view of a notched sector for retaining the operating lever in any desired position and Fig. 6 a detail view of a hinge joint on the operating lever.

Like numerals designate corresponding parts in all of the figures of the drawings.

Referring to the drawing 5 designates the engine shaft, and 6 the engine flywheel. The shaft 5 is arranged to be connected to an intermediate shaft 7, by means of a clutch 8, which is operated by a foot lever 9, in a usual and well known way. This clutch may be disengaged against the action of a spring 10, in a manner well known. The front end of the shaft 7 is reduced at 7' and enters a recess 5' formed in the end of the shaft 5, the rear end of the intermediate shaft is reduced at 11 and enters a recess 12 formed in the end of a driven shaft 13. Suitable roller bearings 14 are interposed between the rear of the intermediate shaft 7 and the enlarged hub 15 of a gear wheel 16, so that all these parts are held in proper endwise alinement with relation to each other, while the shaft 7 is permitted to rotate with respect to shaft 13 under certain conditions.

A hand lever 17 is pivoted at 18 to the transmission case 19 and this lever is connected by a link 20, with a yoke 21. The yoke 21, comprises a ring 22 which has ball bearing engagements with a groove collar 23 of a gear wheel 24. The end of the yoke 21 passes through the opposite ends of a cross bar 25, and springs 26, 27, 28, and 29 are disposed between the cross bar 25 and the nuts 30 carried by the yoke, so that the movement of the yoke with respect to the cross bar is cushioned.

The cross bar 25 has engagement with a grooved collar 31 which collar is pivotally connected at 34, to levers 35 which carry weights 36 at their outer ends. A collar 37 is fixed upon the shaft 13 and rotates therewith and imparts bodily rotation to the levers 35 and the weights 36, so that under the action of centrifugal force these weights tend to move to the dotted line position illustrated in Fig. 1. A spring 38 encircles the shaft 13 and bears between the collar 37 and the collar 31 so that the movement of collar 31 toward the collar 37 is against the tension of the spring 38. A plate 39 is fast upon, and turns with the shaft 13 and this plate limits the movement of the weights 36 toward the right.

It will be apparent that the action of the weights 36 under the centrifugal force brought about by bodily rotation of shaft 13 will result in moving the collar 31 toward the right and consequently in imparting an endwise pull toward the right to the yoke 21. This will result in moving the gear wheel 24 toward the right.

With the parts in the position illustrated in Fig. 1 the mechanism is in low speed, that is the drive from shaft 17 is through the relatively small gear wheel 24 to a larger gear wheel 39 that is fast upon a counter shaft 40, the latter being journaled in the transmission case 41, through a gear wheel 42 carried by the transverse shaft 40 to the gear wheel 16 that is fixed with respect to shaft 13.

When the rate of speed of the driven shaft 13 is sufficient to cause the requisite action of the governor, the yoke 21 will be shifted toward the right in Fig. 1 thereby moving gear wheel 24 toward the right, and out of mesh with the gear wheel 39. This movement of the gear wheel 24 toward the right will bring teeth 43 upon the side face of this gear wheel into mesh with teeth 44 formed upon the abutting side face of an intermediate gear wheel 45. The gear wheel 24 is splined upon the shaft 7 while the gear wheel 45 is loose upon said shaft and slidably mounted with respect thereto. A spring 46 bears between the rear face of the gear wheel 44, and a collar 47 carried by the shaft 7. A stop 48 limits the movement of the gear wheel 45 toward the left under the influence of the spring 46, and when in the movement of the yoke toward the right the teeth 43 are brought into engagement with the teeth 44, the gears will be in second, or intermediate speed. In other words, the drive will be through shaft 7, gear wheel 24, gear wheel 45, intermedite gear wheel 49, on the counter shaft 40, and the gear wheels 42 and 16, to the shaft 13.

Upon continued and increased acceleration of the speed of the shaft 13, the action of the governor will be such as to cause the weights to move to the dotted line position illustrated in Fig. 1, and this action will cause the gear wheel 45 to be moved along with the gear wheel 24, toward the right to such an extent as to bring teeth 50 of the gear wheel 45 into mesh with teeth 51, carried by the front face of the gear wheel 16, this movement of the gear wheel 45 being against the tension of the spring 46. There will then be a direct drive between the engine shaft, and the driven shaft 13, because the gear wheel 24 is splined upon the shaft 7 and directly engages the teeth of the gear wheel 45 and the teeth of this gear wheel in turn directly engage with the teeth 51 of the gear wheel 16 and this gear wheel 16 is fast with respect to the shaft 13.

For reversing the direction of rotation of shaft 13 with respect to the direction of rotation of the shaft 5, gear wheels 52 and 53 are mounted upon a counter shaft 54. The gear wheel 53 meshes with the gear wheel 39 and the gear wheel 24 is adapted to be brought into engagement with the gear wheel 52 upon a sufficient movement of gear wheel 24 to the left in Fig. 1. It is apparent that this movement may be brought about by the proper manipulation of the hand lever 17. Furthermore, it is apparent that if this hand lever be so manipulated that the gear 24 occupies a position between the gear wheels 52 and 39, the parts will be in neutral position and that no rotation of shaft 13 will result.

For the purpose of holding the hand lever 17 in any position to which it may be adjusted either manually or by the governor a notched rack or segment 55 is provided (see Fig. 5). One side of the rack is provided with notches 55, 57 and 58 representing respectively the low, intermediate, and high positions of the hand lever 17. The opposite side of this rack is provided with stops 59 and 60, the hand lever resting against the stop 59 when the parts are in neutral position, and resting against the stop 60 when in reverse.

The springs 26 and 27 not only aid in cushioning the movement of the yoke with respect to the cross bar 25, but they permit the necessary rearward movement of yoke 21 when the gear wheel 24 is being drawn back to mesh with the gear wheel 52, and the pull of the springs upon the hand lever 17 maintains this hand lever in contact with the stop 59 or 60. The hand lever is provided with a side hinge 61, and with a flat spring 62 which normally tends to throw the upper part of the hand lever toward the notches 59 and 60, and maintains the hand lever positively in engagement with these notches until released manually by the operator. To insure the definite and positive movement of the gears to their two respective positions, and their stoppage when they have reached their proper positions, the yoke 21 is provided with notches 63 adapted to be engaged by a ball detent 64 which ball detent is mounted in the chamber 65 of a bracket 66, and is pressed by a block 67 under the action of a spring 68 toward the yoke 21, that leg of the yoke that carries the notches 63 passing through this bracket and being supported by a roller 69, journaled in said bracket. An adjusting screw 70 provides means for adjusting the tension of the spring 68 and consequently determines how much the rate of speed of the shaft 13 must exceed that necessary to move the yoke, before the starting of the movement of the yoke is permitted.

This ball detent provides a frictional drag upon the yoke which insures that the shaft 13 shall have acquired a certain speed before the movement of the yoke starts. By virtue of this provision when the movement of the yoke does start it will continue until the next notch comes into engagement with the ball 54 and consequently the proper alinement of the several gears is insured.

To cushion the movement of the parts and to insure that the action of the engine shaft shall be transmitted to the driven shaft 13, gently and gradually, instead of with a jerk, I provide in the length of the intermediate shaft 7 a shock absorber. This shock absorber comprises sleeve 71 which is internally threaded to engage threads 72 and 73 found upon two separated portions of the shaft 7 and one of which is a right hand thread and the other of which is a left hand thread. A spring 74 bears between a collar 74ª and one end of the sleeve 71, while a spring 75 bears between the opposite end of the sleeve 71 and a collar 76 carried by the shaft 7.

It being understood that the two parts of the shaft 7 being rotative with respect to each other, initial rotation of shaft 7 will cause the sleeve 71 to travel endwise for a limited distance, compressing spring 74 or 75 according to the direction of rotation of the shaft, and only setting up a motion of the other part of the shaft 7 when one or the other of these springs shall have been compressed to a predetermined degree.

While the elements shown and described are well adapted to serve the purposes for which they are intended, it is to be understood that this invention is not limited to the precise construction set forth, but that the devices shown in the accompanying drawing are merely exemplary, and that the invention includes within its purview such changes as fairly come within the spirit of the appended claims.

Having described my invention what I claim is:

1. In a change speed gearing, a driven shaft, a countershaft, spur gear wheels of varying sizes fixed upon the countershaft, three gear wheels of varying sizes on the first named shaft having spur teeth for engagement with the gear wheels of the countershaft and having teeth upon their abutting faces adapted to be brought successively into engagement by an axial movement of the latter gear wheels toward each other, a centrifugal governor having engagement with one of the last named gears and manually operable means for locking said last named gears against movement toward each other under the influence of the centrifugal governor.

2. In a change speed gearing a shaft, a countershaft, spur gear wheels of varying sizes fixed upon the countershaft, three gear wheels of varying sizes on the first named shaft having spur teeth for engagement with the gear wheels of the counter-shaft and having teeth upon their abutting faces adapted to be brought successively into engagement by an axial movement of the latter gear wheels toward each other and a centrifugal governor having engagement with one of the last named gears.

3. In a change speed gearing, the combination with a rotated shaft of a low speed gear wheel splined thereon, an intermediate gear wheel loose and slidable thereon, a driven shaft, a gear wheel fixed thereto, a spring between the last named gear wheel, and the intermediate gear wheel, the latter having teeth upon its opposite side faces and the low speed gear wheel and the gear wheel fixed to the driven shaft having teeth for engagement by the aforesaid teeth, a counter-shaft carrying gear wheels with which the aforesaid gear wheels are adapted to mesh, a centrifugal governor and means under control of the governor for moving the gears on the rotated shaft toward and from each other.

4. A structure as recited in claim 3 embodying means for shifting the last named means manually.

5. A structure as recited in claim 3 comprising a manually operable lever, having connection with the last named means, and a sector with which said lever is engaged whereby the gears may be held against shifting under the influence of the governor in any desired position.

6. In a change speed gearing, the combination with a rotated shaft, a driven shaft having endwise rotative engagement with the rotated shaft, a gear wheel fixed to the driven shaft, an intermediate gear wheel loose and slidable upon the rotated shaft, a spring bearing between said gear wheels, teeth carried by the abutting faces of said gear wheels, a low speed gear wheel splined upon the rotated shaft, teeth carried by the abutting faces of the low speed gear wheel and the intermediate gear wheel, a counter-shaft, gear wheels carried thereby with which the gear wheels of the rotated and driven shafts mesh, a governor, a yoke actuated endwise thereby, and engaged with the low speed gear and a detent engaged with said yoke said yoke and detent having coöperating parts which tend to hold the yoke against movement by the governor when the gear wheels are in their several effective driving positions.

7. In a device of the character described, the combination with a set of change speed gears, a centrifugal governor, a member connected to the gears and the governor for actuating the gears under the influence of the governor, and a frictional detent engaging the member in the several operative positions of the gears to resist the movement of the gears under the influence of the governor until the speed acquired by the governor materially exceeds the speed that would be required to shift the gears if said detent were not present.

8. A device of the character described, comprising an engine shaft, an intermediate shaft, and a driven shaft, in longitudinal alinement with each other, a centrifugal governor carried by, and actuated by the driven shaft, a collar arranged to be shifted under the action of said governor a cross bar mounted to move with said collar, a yoke the ends of which pass through said cross bar, spring means interposed between the cross bar and the yoke, and a set of change speed gears to which the yoke is connected, and by which the change speed gears are shifted.

9. A structure as recited in claim 8, comprising a manually operable lever, and a connection between said lever and said yoke.

10. In a device of the character described, the combination with a rotative shaft, of a counter-shaft disposed in parallelism therewith, three gear wheels fixed upon the counter-shaft, a low speed gear splined to the rotative shaft, and having teeth upon one of its side faces, and having teeth upon its periphery which mesh in certain positions of the gears with one of the gears on the counter-shaft, an intermediate gear on the rotative shaft having teeth upon its periphery adapted to mesh with another of the gears on the counter-shaft and having teeth upon both of its side faces, a driven shaft in endwise alinement with the rotative shaft and capable of rotation with respect thereto and a gear wheel fixed to the driven shaft and meshing with the third of said gear wheels upon the counter-shaft, said fixed gear being provided with teeth upon its face adapted to mesh with the teeth upon one of the faces of the intermediate gear wheel, a spring bearing between the intermediate gear wheel and the gear wheel that is carried by the driven shaft, a second counter-shaft and a pair of gear wheels carried by the second counter-shaft one of which meshes with one of the gear wheels upon the first named counter-shaft and the other of which is adapted to have engagement with the low speed gear of the rotative shaft.

In testimony whereof I affix my signature.

HERBERT L. DUNCAN.